Patented Aug. 5, 1952

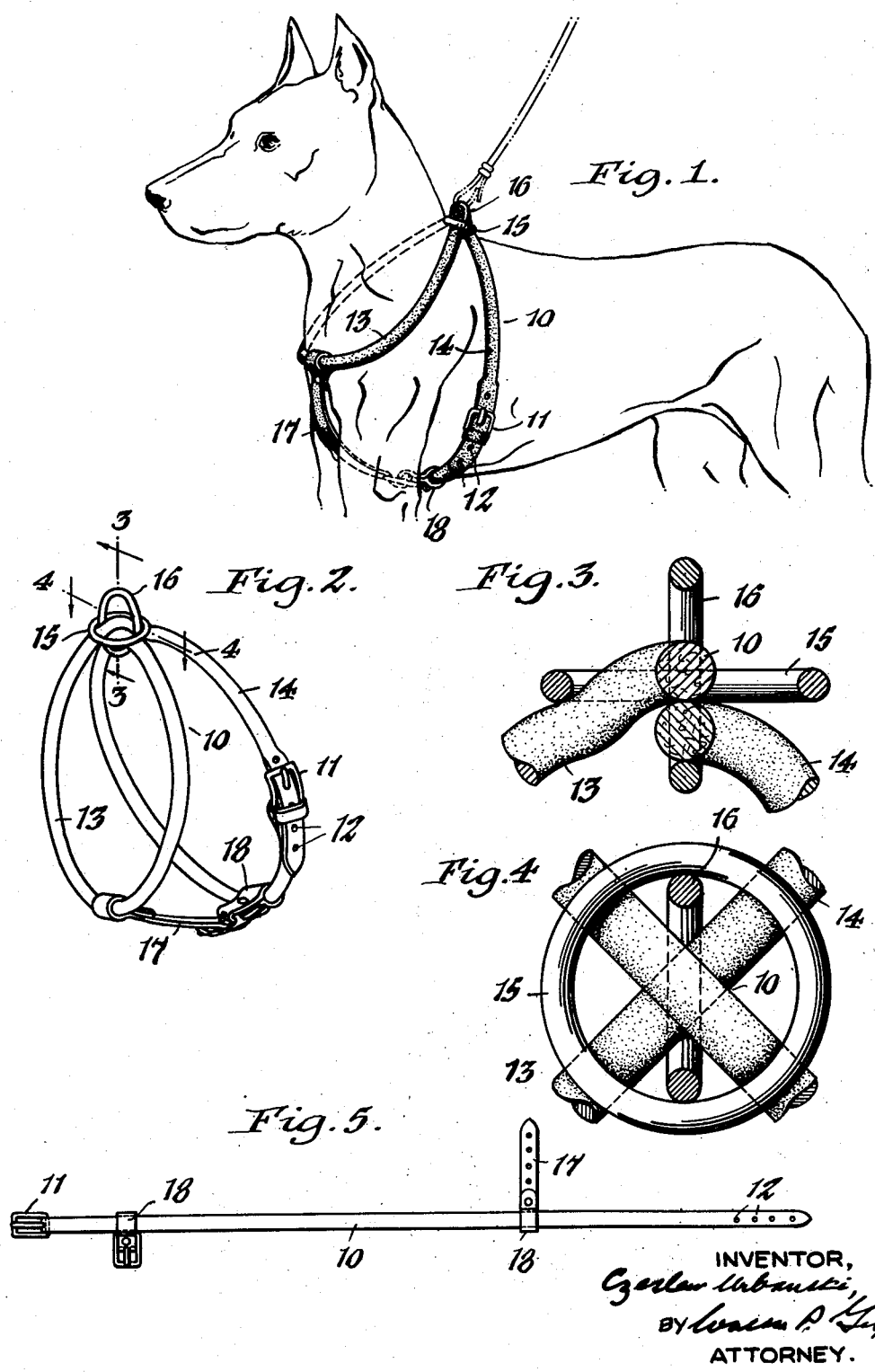

2,605,744

UNITED STATES PATENT OFFICE 2,605,744

DOG HARNESS

Czeslaw Urbanski, Buffalo, N. Y.

Application December 6, 1946, Serial No. 714,538

5 Claims. (Cl. 119—96)

This invention relates to certain new and useful improvements in harnesses, but more particularly to a dog harness.

It has for one of its objects to provide a harness of this character whose main body-engaging member is made from a single length of strap or belting material which is strong, durable and inexpensive in construction, and which requires but a minimum of skill and time to assemble or manufacture.

Another object of the invention is to provide a dog harness which is so designed and constructed as to be readily adjustable, and which embodies novel means for dividing and effectually locking or coupling the one-piece harness into head and body engaging loops or sections and at the same time serve as a hitch or connection for a leash.

Other features of the invention reside in the construction and arrangement of parts hereinafter described and particularly pointed out in the appended claims.

In the accompanying drawings:

Figure 1 is a side elevation of my improved harness in operative position on a dog. Figure 2 is a detached perspective view thereof. Figure 3 is an enlarged vertical cross section taken on line 3—3, Figure 2. Figure 4 is an enlarged horizontal section taken on line 4—4, Figure 3. Figure 5 is a plan view on a reduced scale of the strap-forming harness prior to assembly into harness form.

Similar characters of reference indicate the corresponding parts throughout the several views.

My invention is an improvement on the "Martingale" type or style of dog harness which includes separate loop-shaped portions adapted to engage the neck or shoulder and body sections of the dog and an adjustable tie member connecting the lower sides of such portions. In the preferred construction of my harness shown in the drawings, the loop-shaped portions thereof are made from a flexible member consisting of a single main strap 10 of either flat or round leather stock which is provided at one end with a buckle 11 and at its opposite or billet end with a row of holes 12 for adjusting the harness properly on the dog. This one-piece strap is turned upon itself or wound in crossed or substantially figure-8 relation to provide resulting loops 13 and 14 which at their medial point of intersection are interlaced and interlocked with complementary floating coupling rings 15 and 16 of different diameters. The front loop 13 is closed and serves as a collar and is adapted to be placed over the head of the dog to engage its neck or shoulders, while the rear or companion buckle-bearing loop 14 is open and adapted to be placed and properly adjusted and closed about the body of the dog to the rear of its front legs, as shown in Figure 1. A sliding billet or tie strap 17 is loop-connected at one end to the lower side of the neck-loop 13 of the harness while its opposite end is adjustably and buckle-connected to a sliding piece or chape 18 applied to the lower side of the companion harness-loop 14, this strap extending lengthwise of the dog's body and between its front legs.

It will be noted that the interlocking strap-engaging rings 15 and 16, which are independent and separate from each other, are disposed at substantially right angles to each other with the larger ring 15 being disposed horizontally and the smaller ring 16 being disposed vertically in diametrical relation to the former and partially intersecting or protruding through the same at its lower side. The loop-shaping of the one-piece strap in interlaced or interlocked relation with these rings to provide the resulting harness-loops 13 and 14 is effected in the following manner:

The main strap 10, with the sliding tie strap or billet 17 removed therefrom, is grasped at its hole-bearing or billet end 12 with one hand while the rings 15 and 16 are grasped in the other hand in the relation shown in Figure 2. The billet end of the strap is first passed under the larger ring 15, then through the subtended lower portion of the smaller ring and thence outwardly under the larger ring at the diametrically opposite side thereof, a sufficient length of the strap being pulled through the ring to provide the front of neck-engaging loop 13. It will be noted that this interlaced portion of the strap, while extending diametrically across the larger ring 15, extends obliquely or diagonally to the plane of the smaller ring 16. The sliding billet or tie strap 17 is now assembled on the main strap 10 by threading the free end of the latter through the attaching loop of the former, after which such free or billet end of the main strap is disposed in crossed relation to the previously interlaced portion by first passing it under the larger ring, through the smaller ring 16 and over the contiguous or chordal portion of previously interlaced portion, and then under the larger ring and outwardly through the diametrically opposite side thereof to be joined with the buckle 11 and provide the body-engaging loop 14. The neck-engaging loop 13 is slidingly adjusted in the rings 15, 16 to the size desired and the adjustment of the companion loop 14 about the body of the dog is effected by the billet end of the strap 10 and its buckle.

When the harness is applied to the dog, the complemental strap-engaging rings 15, 16 assume a position on the front portion of the dog's back, the interlacing of the crossed portions of the strap therewith effectually dividing the strap into the adjustable loops 13, 14 and positively interlocking them against slippage or becoming loose. By the interlocking action the smaller ring 16 is also effectually held in the position shown and it conveniently serves as a hitch for a leash.

I claim as my invention:

1. A harness of the character described, comprising a flexible member consisting of a single length of strap-like material provided at its ends with a mating buckle and billet end and turned upon itself in crossed fashion to provide a closed loop at one side of the point of intersection and an open adjustable loop at the opposite side thereof, and coupling rings disposed in free floating relation and at substantially right angles to each other in intersecting vertical and horizontal diametric planes at the point of intersection of said loop-forming member, the intersecting portions of said member being interlaced and interconnected between the protruding end of one of the rings and the opposing diametric portions of the companion ring.

2. The combination with a flexible harness-forming member consisting of a single length of strap-like material formed into substantially the shape of the figure 8 to provide harness loops, of a pair of coupling rings disposed at substantially right angles to each other in diametric relation at the point of intersection of said loop-forming member and with which the crossed portions of said member are interlaced, one of the rings being of a diameter to protrude only part way through the companion ring for the passage therethrough at one side of the latter ring of the crossed portions of the loop-forming member while the adjoining portions thereof pass under such companion ring, the other protruding portion of the first-named ring serving as a hitch for a leash.

3. A connector for an adjustable dog harness, comprising a pair of complementary floating coupling rings of different diameters disposed at substantially right angles to each other and with the smaller ring partially intersecting and protruding downwardly through the companion larger ring in diametric relation thereto to receive the harness in interlaced and crossed relation beneath the larger ring, the upper protruding portion of the smaller ring serving as a hitch for a leash.

4. A connector for an adjustable dog harness, comprising a pair of complementary floating coupling rings of different diameters disposed at substantially right angles to each other and with the smaller ring intersecting and contacting at its periphery with the opposing inner periphery of the larger ring substantially at a point diametrically thereof.

5. A harness of the character described, comprising a flexible member consisting of a single length of strap-like material turned upon itself in crossed fashion to provide harness loops, and separate and independent coupling rings of different diameters disposed in partial diametrically intersecting relation with the smaller ring disposed substantially vertically and with its upper protruding portion serving as a hitch for a leash, the crossed portions of the strap-like member being interlaced in superposed fashion between the lower protruding portion of the vertical ring and the opposing underside of the companion larger intersecting ring.

CZESLAW URBANSKI.

REFERENCES CITED

The following references are of record in the file of this patent:

UNITED STATES PATENTS

| Number | Name | Date |
|---|---|---|
| 1,603,484 | Meissner | Oct. 19, 1926 |
| 1,781,078 | Place | Nov. 11, 1930 |
| 1,800,421 | Wickersham | Apr. 14, 1931 |
| 2,187,021 | Everson | Jan. 16, 1940 |

FOREIGN PATENTS

| Number | Country | Date |
|---|---|---|
| 933 | Great Britain | Apr. 30, 1908 |
| 640,609 | France | July 18, 1928 |